April 23, 1940. J. V. CRITCHLEY Re. 21,430

TOP LIFT ATTACHMENT

Original Filed May 29, 1934

Witness

Paul F. Bryant

Inventor

James Verner Critchley
by his Attorneys
Fish Hildreth Carey & Dorsey.

Reissued Apr. 23, 1940

Re. 21,430

UNITED STATES PATENT OFFICE 21,430

TOP LIFT ATTACHMENT

James Verner Critchley, Worcester, Mass., assignor to Fitz-On Sales Corporation, Worcester, Mass., a corporation of Massachusetts Original No. 2,111,314, dated March 15, 1938, Serial No. 728,080, May 29, 1934. Application for reissue March 5, 1940, Serial No. 322,415

2 Claims. (Cl. 36—42)

The present invention relates to means for detachably connecting a heel lift or top lift to a suitable heel base, and is concerned principally with attachments of this character designed for securing in detachable relation a woman's top lift to an elongated heel base in which has previously been mounted a metallic socket or receiving member of suitable style and conformation.

The purpose and object of the invention is to improve the form and construction of a metallic post with attached top lift designed for reception and engagement in a similarly shaped metallic socket of non-circular cross-section, the post firmly engaging with the socket upon assembly therewith in a manner to prevent accidental withdrawal, and being accurately located to permit similarly accurate registration of the secured top lift with respect to the supporting heel base.

With this and other similar objects in view, the invention contemplates essentially the provision of a post triangular in cross-section, with the base of the triangle relatively non-yielding, and designed for abutting engagement with a similar wall of the socket to accurately locate the post with respect to the socket. This non-yielding portion constituting the base of the triangle, has extending therefrom opposite side portions which incline toward one another to form the apex of the triangle, and which are resilient or yielding to permit contraction of the post upon insertion in the socket. This capacity for contraction of the post is based in part upon the fact that the free edges of the sides of the triangle have capacity for movement toward and from one another, and the providing of opposite free edges for certain portions of the triangle legs through the employment of longitudinal slots piercing the walls of the post.

Figure 4:
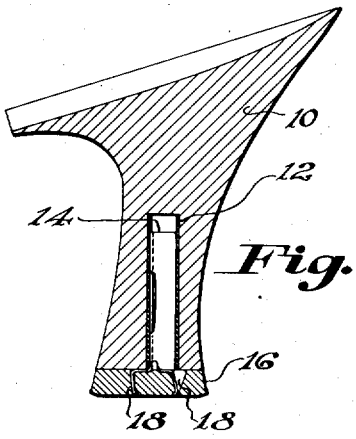
Figure 1:
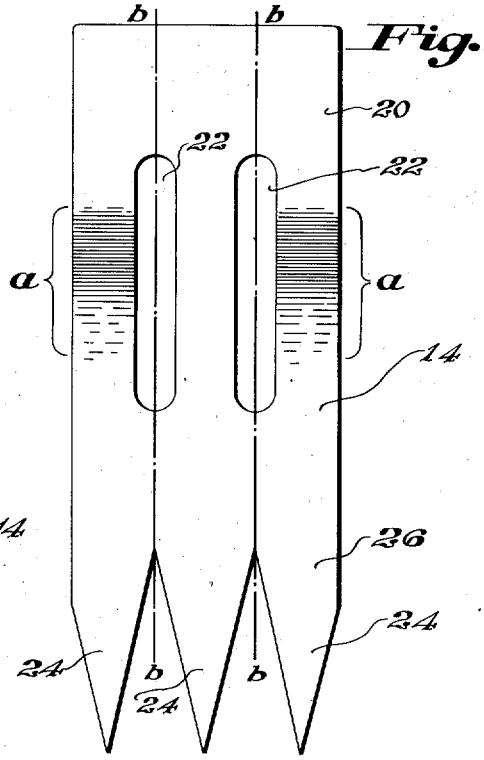
Figure 2:
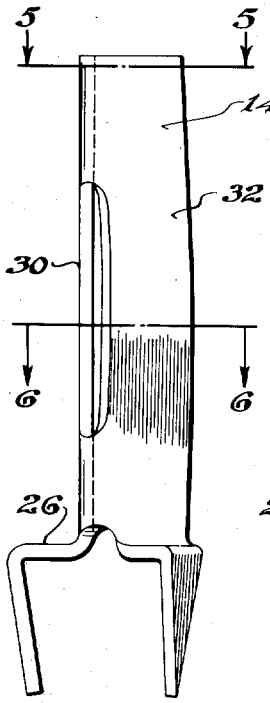
Figure 3:
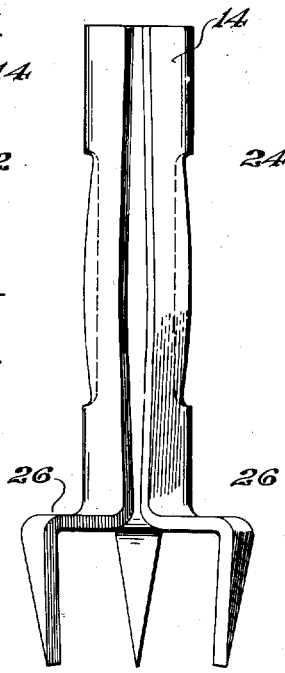
Figure 5:
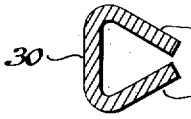
Figure 6:
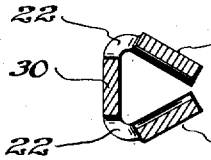

In the accompanying drawing illustrating the preferred form of the invention, Fig. 1 represents a plan view of the blank from which the post is drawn and folded; Fig. 2 is a side elevation of the post before attachment of the top lift; Fig. 3 is a similar side elevation taken at right angles to Fig. 2; Fig. 4 is a section in elevation illustrating the improved post assembly with a top lift and mounted in the socket; and Figs. 5 and 6 are details illustrating cross-sections of the post upon the section lines 5 and 6, respectively, of Fig. 2.

The present invention in its illustrated embodiment is incorporated within a heel base 10 of wood or other suitable material, this heel base having an elongated opening of non-circular section within which is received and secured a metallic socket 12 of triangular cross-section. The post 14 of similar cross-section is inserted within the socket and frictionally maintained in detachable enegagement, the post carrying at its lower end a top lift 16 permanently secured to the post through the engaging claws of fingers 18 formed integrally with the base of the post.

As indicated more particularly in Figs. 1 to 3 and 5 and 6, the post 14 is formed from a blank 20 having the approximate shape shown in Fig. 1, and provided with longitudinal openings 22 extending partially lengthwise thereof, and separated and pointed integral portions 24 for the formation of the attaching claws. The blank is provided with outwardly arched or bowed portions in the region *a*, and with offsets 26 to separate the attaching claws from the sides of the post.

The blank is folded into triangular shape along the dot and dash lines *b* in Fig. 1, to provide the generally triangular post indicated in Figs. 2 and 3. It will be evident that the side of the post lying between the folding lines *b*—*b* is straight and unarched, and may be said to constitute the base 30 of the triangle indicated in Fig. 5. The portions at each side of the lines of fold constitute opposite sides of legs of the triangle indicated at 32, these sides being preferably arched or bowed, and having opposite free edges throughout a portion of their length due to the openings 22 to permit contraction on frictional engagement with the socket. Furthermore, the fold portion does not bring the free edges of the sides in close or rigid contact at the openings of the triangle, leaving the sides free for some come and go.

The general appearance and conformation of the finished post is as indicated in Figs. 2 and 3, where the base of the triangle is shown at the left with the straight side which abuts the corresponding wall of the socket and accurately locates the post therein, the opposing sides 32 being slightly bowed and frictionally engaging with the wall of the socket to exert pressure thereon and maintain the straight or non-yielding side in positioning relationship. Figs. 5 and 6 showing sections of the post, indicate the approximate shape of the post throughout its length.

This type of construction is simple, may be manufactured in production with great uniformity, accurately and rigidly locates the post and attached top lift with respect to the heel base and embedded socket, and maintains a sufficiently firm frictional engagement with the socket to prevent any accidental withdrawal or removal of the top lift. It nevertheless permits deliberate withdrawal of the top lift and attached post when desired for substitution of a new top lift. From the point of view of its practical utility, the present construction is superior to any form of rigid lock between the post and socket, or to any yielding interengagement which does not likewise center and locate the post.

What is claimed is:

1. A top lift attachment, comprising a socket of generally triangular cross-section in a heel base, a metallic post fitting within the socket and of similar cross-section, the post being provided with a straight and substantially non-resilient wall forming the base of the triangle and abutting a similar wall of the socket and with side walls, each having an outwardly bowed resilient portion throughout a part of its length, the outwardly bowed portions of the side walls being integrally connected to the base member at opposite ends and separated therefrom throughout the bowed resilient region by lengthwise slots which permit the bowed portions to frictionally engage the corresponding walls of the socket and center and locate the post through contact of the base wall with the corresponding wall of the socket.

2. A top lift attachment, comprising a metallic socket of generally triangular cross-section mounted in a heel base, a metallic post engaging within the socket and of similar cross-section, the post being folded into triangular tubular form comprising essentially a non-resilient wall forming the base of the triangle and abutting a similar wall of the socket and with two side walls inclined toward one another, each having an outwardly bowed resilient portion formed integrally therewith and designed for contraction through engagement with the corresponding wall of the socket, the side walls being integrally connected with the base wall at opposite ends of the post and separated therefrom intermediate their ends by lengthwise slots formed at the folded juncture of the base and side walls to permit proper centering of the base through the action of the resilient portions in cooperation with the inflexible base wall.

JAMES VERNER CRITCHLEY.